June 22, 1954   R. L. HAMILL   2,681,809
COMBINED SEAT AND TOTE BOX FOR FISHERMEN'S USE
Filed Dec. 30, 1950

INVENTOR.
Raymond L. Hamill
BY
Attorney.

Patented June 22, 1954

2,681,809

UNITED STATES PATENT OFFICE 2,681,809

COMBINED SEAT AND TOTE BOX FOR FISHERMEN'S USE

Raymond L. Hamill, Grass Lake, Mich.

Application December 30, 1950, Serial No. 203,727

11 Claims. (Cl. 280—12)

This invention relates to improvements in combined seat and tote box for fishermen's use.

The main objects of this invention are:

First, to provide a combined seat and tote box which may be carried or pulled as a sled and one which when pulled as a sled is maintained in upright position and if it should be upset a lifting or upward pull on the rope swings it to upright position.

Second, to provide a combined seat and tote box for fishermen with a combined back, foot rest and auxiliary cover member which is adapted to be positioned as an auxiliary cover and foot rest or to be positioned as a back rest.

Third, to provide a structure in which fishing tackle or implements may be disposed and effectively retained in the box although longer than the box.

Objects relating to details and economies of the invention will appear from the description to follow. The invention is pointed out in the claims.

A preferred embodiment of the invention is illustrated in the accompanying drawing, in which.

Figure 1:
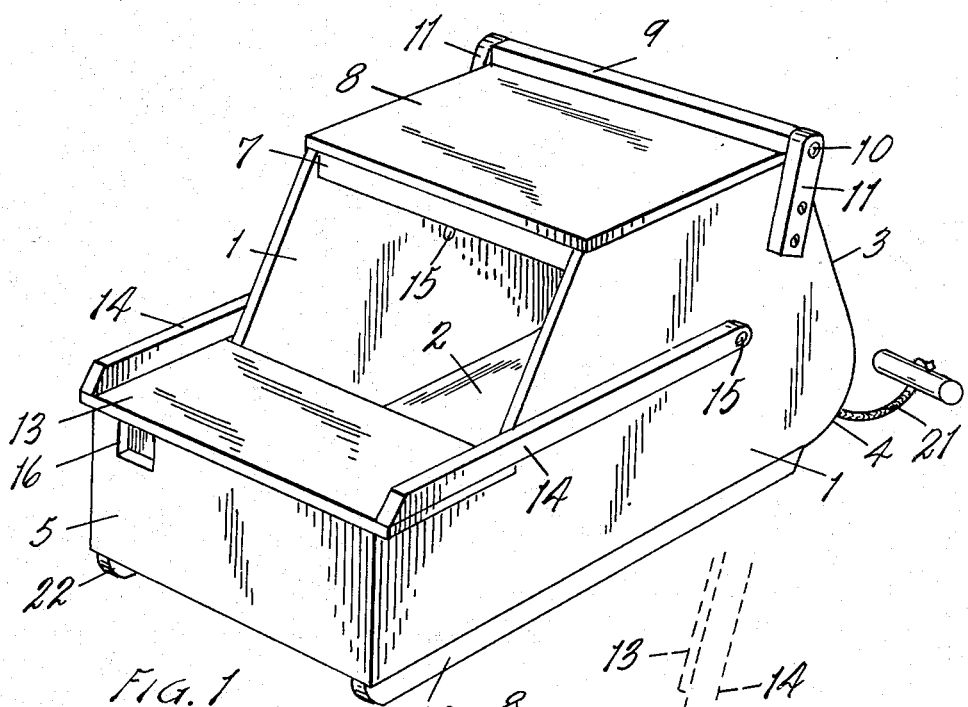
Fig. 1 is a perspective view with the seat and auxiliary cover and back rest member in box closing position.

The embodiment of my invention illustrated comprises stepped side walls 1—1, the lower step being disposed rearwardly. The bottom 2 and the front wall 3 are formed integrally of a panel, preferably of plywood, the bottom and front wall merging in the forward curve 4 which provides a nose for the box. The rear wall 5 is of a height corresponding to the rear step portions 6 of the side walls. The fastenings for the walls are not illustrated as they may be secured together by screws or nails or glue, if desired.

The crossbar 7 is disposed between the wider or front step of the side walls at the rear edge thereof as shown in the drawing and constitutes a handle for carrying the box. The combined seat and main cover member 8 is provided with a crosspiece 9 at its front edge having pintle extensions 10 at its ends engaging the pivot brackets 11 which are secured to the sides 1 to project above the same. The front wall and side walls are connected by means of the crosspiece 12.

Figure 2:
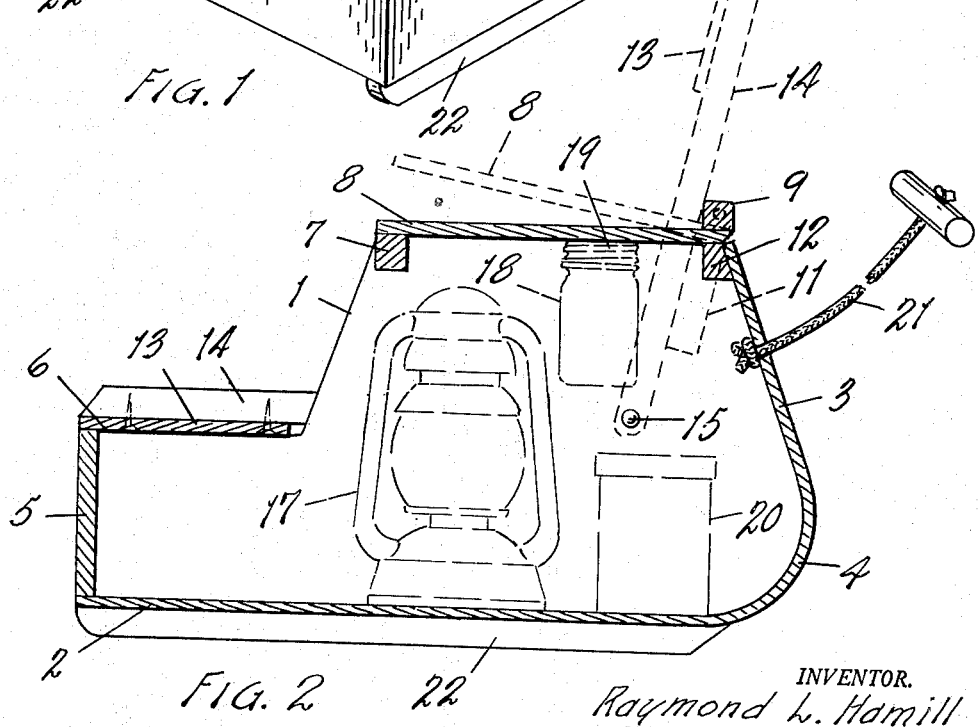
Fig. 2 is a longitudinal section with the combined back rest and cover member shown in back rest position by dotted lines and the cover shown in partially open position by dotted lines.

The combined auxiliary cover, back and foot rest 13 is provided with rearwardly projecting arms 14 disposed at the sides of the side walls and pivoted thereto at 15 to be swung to a collapsed or cover position, as shown by full lines in the drawings, resting upon the lower step portion of the side walls or swung to back position against the bracket members 11 which serve as stops or rests for the arms as shown by dotted lines in Fig. 2. The rear wall of the box is provided with an opening 16 in its upper edge through which the handles of implements or fishing rods or other tackle longer than the box may project. The auxiliary cover member 13 acts to close the opening 16, thereby retaining the tools or tackle projecting through the opening.

The box is designed to receive a heating means such as a lantern indicated by the dotted lines 17 in Fig. 2, the bait can 18, the cover 19, which is secured to the underside of the seat and cover member 8, and a food or other receptacle 20 and tackle box or the like, not illustrated. The opening between the combined seat cover 8 and the auxiliary cover 13, when they are in closed position, serves to permit the heated air to escape. The pull or drag rope 21 is secured to the front wall 3 in the vertical center thereof and above the center of gravity of the box so that a pull on the rope tends to maintain the box in upright position and to right the box if it should tip over as the result of uneven snow or the like. The runners 22 are secured to the bottom of the box and serve as reinforcing means therefor.

The structure illustrated is especially designed for the use of ice fishermen. The structure is compact and can be readily transported and serves as a box for handling tackle and other equipment and for storage thereof when not in use.

I have illustrated and described my invention in a highly practical embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. A combined seat and tote box for fishermen's use comprising rearwardly stepped side walls, a bottom, and front and rear walls, pivot brackets secured to the outer sides of the side walls to project above the upper edges thereof, a combined seat and cover provided with a crosspiece at its front end pivoted to said pivot brackets to permit the seat to rest when closed upon the upper edges of the side walls or to be swung upwardly, and a combined back, foot rest and auxiliary cover member provided with arms disposed on the outer sides of and pivoted to the side walls to be adjusted to back rest position in supported engagement with said pivot brackets or to closed foot rest position resting on the upper edges of the rear step portions of the side walls, the rear wall having an opening in the upper edge thereof through which fishing tackle or implements disposed in the box may project.

2. A combined seat and tote box for fishermen's use comprising rearwardly stepped side walls, a bottom, and front and rear walls, pivot brackets secured to the outer sides of the side walls to project above the upper edges thereof, a combined seat and cover provided with a crosspiece at its front end pivoted to said pivot brackets to permit the seat to rest when closed upon the upper edges of the side walls or to be swung upwardly, and a combined back, foot rest and auxiliary cover member provided with arms disposed on the outer sides of and pivoted to the side walls to be adjusted to back rest position in supported engagement with said pivot brackets or to closed foot rest position resting on the upper edges of the rear step portions of the side walls.

3. A combined seat and tote box for fishermen's use comprising a bottom, rearwardly stepped side walls, and front and rear walls, the front wall being rearwardly inclined, the bottom and front wall being formed of a panel and merging in a curve providing a nose portion, a crossbar extending between the side walls at the rear edges of the higher step thereof and constituting a handle for the box, pivot brackets secured to the outer sides of the side walls to project above the upper edges thereof, a combined seat and cover member provided with a crosspiece at its front end pivoted to said pivot brackets so that the seat may rest upon the upper edges of the side walls and said crossbar or be swung upwardly to open position, a combined back rest, foot rest and auxiliary cover member provided with arms disposed on the outer sides of and pivoted to the side walls so that it may be adjusted to back rest position in supported relation to said pivot brackets or to foot rest and cover position resting on the upper edges of the rear step portions of the side walls, runners on the bottom, and a pull rope secured to the front wall in approximately the vertical center line thereof and above the center of gravity of the box so that the draft of pull rope tends to maintain the box in upright position.

4. A combined seat and tote box for fishermen's use comprising a bottom, rearwardly stepped side walls, and front and rear walls, a crossbar extending between the side walls at the rear edges of the higher step thereof and constituting a handle for the box, pivot brackets secured to the outer sides of the side walls to project above the upper edges thereof, a combined seat and cover member provided with a crosspiece at its front end pivoted to said pivot brackets so that the seat may rest upon the upper edges of the side walls and said crossbar or be swung upwardly to open position, and a combined back rest, foot rest and auxiliary cover member provided with arms disposed on the outer sides of and pivoted to the side walls so that it may be adjusted to back rest position in supported relation to said pivot brackets or to foot rest and cover position resting on the upper edges of the rear step portions of the side walls.

5. A combined seat and tote box for fishermen's use comprising rearwardly stepped side walls, a bottom, and front and rear walls, a combined seat and cover member swingably mounted at its front edge to the front upper corners of the side walls to rest upon the upper edges of the front step of the side walls, a combined back rest and auxiliary cover swingably mounted to the side walls to be adjusted to back rest position or to cover position resting on the upper edges of the rear step portions of the side walls, runners on the bottom, and a pull rope secured to the front wall in approximately the vertical center line thereof and above the center of gravity of the box so that pull thereon tends to maintain the box in upright position.

6. A combined seat and tote box for fishermen's use comprising rearwardly stepped side walls, a bottom, and front and rear walls, a combined seat and cover member swingably mounted along the upper front edge of the box to rest upon the upper edges of the front step of the side walls, and a combined back rest and auxiliary cover swingably mounted to the side walls to be adjusted to back rest position or to cover position resting on the upper edges of the rear step portions of the side walls.

7. A combined seat and tote box for fishermen's use comprising rearwardly stepped side walls, a bottom, and front and rear walls, a crossbar constituting a hand hold extending between the side walls of the higher step thereof, a combined seat and cover member swingably mounted along one edge to an upper edge of the box to rest upon the upper edges of the front step of the side walls, and a combined back rest and auxiliary cover swingably mounted to the side walls to be adjusted to back rest position or to cover position resting on the upper edges of the rear step portions of the side walls.

8. A combined seat and tote box for fishermen's use comprising rearwardly stepped side walls, a bottom, and front and rear walls, a combined seat and cover member swingably mounted along one edge to an upper edge of the box to rest upon the upper edges of the front step of the side walls, and a combined back rest and auxiliary cover swingably mounted to the side walls to be adjusted to back rest position or to cover position resting on the upper edges of the rear step portions of the side walls, the rear wall having an opening in the upper edge thereof through which tackle or implements disposed in the box may project.

9. A combined seat and tote box for fishermen's use combining rearwardly stepped side walls, a bottom, and front and rear walls, the front wall being rearwardly inclined, the bottom and front wall being formed of a panel merging in a curve providing a nose portion when the structure is dragged forwardly, a combined seat and cover swingably mounted along its front edge to the upper front corners of the side walls to rest upon the upper edges of the front step when swung to seat and cover position, a combined back and auxiliary cover member provided with arms disposed on the outer sides of and pivoted to the said side walls to be swingably adjusted to upright back rest position at the front of the combined seat and cover when it is adjusted to seat and cover position or to closed foot rest position resting on the upper edges of the rear step portion of the side walls, and stops on said side walls positioned to coact with said arms in supporting said combined back and auxiliary cover member in back rest position.

10. A combined seat and tote box for fishermen's use combining rearwardly stepped side walls, a bottom, and front and rear walls, the front wall being rearwardly inclined, a combined seat and cover swingably mounted along its front edge to the upper front edge of the box to rest upon the upper edges of the front step when swung to seat and cover position and a combined back and auxiliary cover member provided with arms disposed on the outer sides of and pivoted to the said side walls to be swingably adjusted to upright back rest position at the front of the combined seat and cover when it is adjusted to seat and cover position or to closed foot rest position resting on the upper edges of the rear step portion of the side walls.

11. A combined seat and tote box for fishermen's use comprising, a bottom and rearwardly stepped side walls, and front and rear walls, a combined seat and cover member swingably mounted along one edge to a front edge of the box to rest on the upper edges of the rear step of the side walls when in seat and cover position, and a combined back rest and auxiliary cover member provided with arms pivotally mounted on said side walls so that the combined back rest and auxiliary cover member may be swung over the said seat and cover member when it is in closed seat constituting position to a position at the front of seat and cover member to constitute a back rest or swung rearwardly to foot rest position resting on the rear step of the side walls, the rear wall having an opening in the upper edge thereof through which tackle or implements disposed in the box may project.

References Cited in the file of this patent

UNITED STATES PATENTS

| Number | Name | Date |
|---|---|---|
| D. 157,067 | Metro | Jan. 31, 1950 |
| 630,427 | Turner | Aug. 8, 1899 |
| 663,632 | Mack | Dec. 11, 1900 |
| 815,046 | Sherman | Mar. 13, 1906 |
| 1,585,575 | Van Husan | May 18, 1926 |
| 2,147,798 | Pilcher | Feb. 21, 1939 |
| 2,264,744 | Dunnam | Dec. 2, 1941 |
| 2,357,214 | McDole | Aug. 29, 1944 |
| 2,446,601 | Lelyveld | Aug. 10, 1948 |

FOREIGN PATENTS

| Number | Country | Date |
|---|---|---|
| 329,915 | Great Britain | May 29, 1930 |